United States Patent Office 2,906,750
Patented Sept. 29, 1959

2,906,750
3β,11α-DIHYDROXY SPIROSTANS

Carl Djerassi, Detroit, Mich., and George Rosenkranz, Mexico City, Mexico, assignors to Syntex S.A., Mexico City, Mexico, a corporation of Mexico No Drawing. Application June 3, 1952
Serial No. 291,556

Claims priority, application Mexico June 9, 1951

3 Claims. (Cl. 260—239.55)

The present invention relates to novel cyclopentanophenanthrene compounds and a process for the production thereof. More particularly the present invention relates to novel 11α hydroxy spirostans and a process for producing these compounds from the corresponding Δ$^{8(9)}$-7-keto-11α-hydroxy spirosten compounds.

Compounds of the character described in the present application are of special importance as intermediates for the production of cortisone, as the spirostan side chain at 16—17 may be converted readily by known methods to the 17 side chain of cortisone, the compounds may be provided with the 3 keto Δ$^4$ structure in ring A by known methods, and the 11α hydroxy may also be oxidized to an 11 keto group.

Although it has been previously indicated in the literature (Barton and Cox, J.A.C.S. 214, 1949) that the double bond in the 8(9) position of the cyclopentanophenanthrene molecule cannot be hydrogenated, in accordance with the present invention, it has been discovered that in the presence of a suitable catalyst such as a palladium catalyst, the 8(9) double bond in spirosten compounds may be hydrogenated when there is present a 7 keto group, and especially an 11α hydroxy group and a 7 keto group.

There has therefore been discovered a novel method for converting Δ$^{8(9)}$-7-keto-11α-hydroxy-spirosten compounds of the type disclosed for example in copending application of Djerassi and Rosenkranz, Serial No. 226,534, now abandoned into the novel corresponding saturated 7-keto-11α-hydroxy-spirostan compounds. Further in accordance with the present invention it has been discovered that Wolff-Kishner reduction of these last mentioned compounds produces the corresponding novel 11α-hydroxy spirostan compounds.

The process of the present invention may be exemplified by the following equation:

Although in the above equation a compound of the 22-isoallospirosten series has been shown by way of example, namely Δ$^{8(9)}$-22-isoallospirosten-3β,11α-diol-7-one, other spirosten compounds may be used including compounds of opposite configuration at positions 3, 5, 11 and 22 of the molecule. In each instance the corresponding novel compounds having the nuclear structures exemplified above are produced.

Further the above compounds may be esterified in position 3 or 11 so that the corresponding esters are formed in each of the steps of the process above outlined. Preferably the 3 or 11 hydroxy group is esterified with a lower fatty acid such as acetic or propionic or an aromatic acid such as benzoic.

The process above outlined may be practiced by dissolving the Δ$^{8(9)}$-22-spirosten-7-keto-11α-hydroxy compound in a suitable inert solvent such as ethanol and shaking the solution in a hydrogen atmosphere with a suitable hydrogenation catalyst such as a palladium catalyst. After the reaction ceased i.e. in about 1½ hours and suitable purification (removal of catalyst by filtration, crystallization from an inert organic solvent, etc.) gave the corresponding 11α-hydroxy-7-one-compound.

The 11α-hydroxy-7-one compound produced in accordance with the step of the process just outlined could then be treated to eliminate the 7-keto group according to the Wolff-Kishner method and more particularly according to the modification of this method disclosed by Huang-Minlon in U.S. Patent Number 2,471,697, whereby the compound is first refluxed in a glycol solvent such as ethylene glycol with hydrazine hydrate for a short period of time or about an hour. Thereafter an alkali method hydroxide such as potassium hydroxide in water is added and the mixture heated in open flask until the temperature of the vapors reached approximately 190° C. A reflux condenser is then attached and the mixture refluxed for a further period of about 4 hours. The product is then precipitated by pouring the reaction mixture into cold water and purified by crystallization from a suitable solvent such as acetone.

The following specific examples serve to illustrate the present invention but are not intended to limit the same.

Example I

A solution of 1 g. of Δ$^8$-22-isoallospirosten-3β,11α-diol-7-one in 100 cc. of absolute alcohol was hydrogenated at room temperature and atmospheric pressure

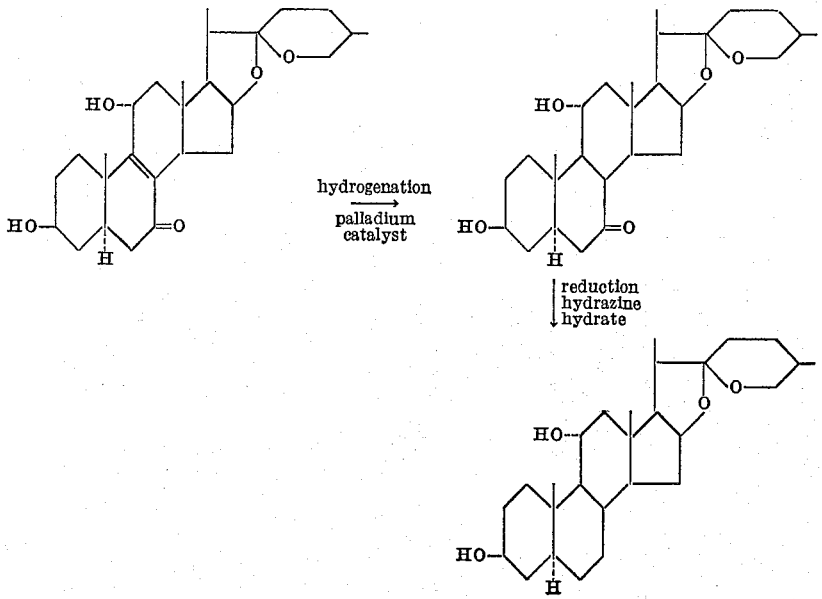

with 200 mg. of palladium-charcoal catalyst which had been previously reduced. When the reaction ceased after 90 minutes, the equivalent of one mol of hydrogen had been absorbed. The catalyst was filtered and the solution was evaporated to dryness and the residue crystallized from acetone to give 22-isoallospirostan-3β,11α-diol-7-one, M.P. 236–237°, $[\alpha]_D$ —126° (chloroform). This compound has no selective absorption in the ultraviolet, thus proving that the double bond has been hydrogenated. The infrared spectrum shows a band at 1702 cm.$^{-1}$, characteristic of isolated carbonyl groups.

*Example II*

A solution of 500 mg. of 22-isoallospirostan-3β,11α-diol-7-one in 15 cc. of ethylene glycol was heated with 2 cc. of 85% hydrazine hydrate during one hour. 0.9 g. of potassium hydroxide in 2 cc. of water were added to the cooled solution and the mixture was heated in an open flask until the temperature of the escaping vapors reached 190°. A reflux condenser was attached and the mixture refluxed during four additional hours. After pouring in water, the precipitate was collected and washed until neutral. This precipitate of 22-isoallospirostan-3β,11α-diol is of gelatinous consistency and has a great tendency to retain the solvent, but it can be crystallized from acetone to yield the 22-isoallospirostan-3β,11α-diol, M.P. 217–218° C., $[\alpha]_D$ —71° (chloroform). Conventional acetylation gave 22-isoallospirostan-3β,11α-diol diacetate, M.P. 172–175° C.

We claim:
1. 22-isoallospirostan-3β,11α-diol-7-one.
2. 22-isoallospirostan-3β,11α-diol.
3. 22-isoallospirostan-3β,11α-diol diacetate.

References Cited in the file of this patent

UNITED STATES PATENTS 2,712,027    Rosenkranz et al. _____ June 28, 1955

OTHER REFERENCES

Chamberlain: J. American Chem. Soc., May 1951, pages 2396–2397.

Stork: J. American Chem. Soc., July 1951, pages 3546 and 3547.

J. Amer. Chem. Soc., November 1951, pages 5513–4.